US010499252B1

(12) United States Patent
Armand (10) Patent No.: US 10,499,252 B1
(45) Date of Patent: Dec. 3, 2019

(54) DYNAMIC SPECTRUM SHARING (71) Applicant: T-Mobile USA, Inc., Bellevue, WA (US)

(72) Inventor: Ahmad Armand, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/195,643

(22) Filed: Nov. 19, 2018

(51) Int. Cl.
H04W 40/00 (2009.01)
H04W 16/10 (2009.01)
H04W 16/28 (2009.01)
H04W 16/14 (2009.01)

(52) U.S. Cl.
CPC ........... *H04W 16/10* (2013.01); *H04W 16/14* (2013.01); *H04W 16/28* (2013.01)

(58) Field of Classification Search
CPC ...... H04W 16/10; H04W 16/14; H04W 16/28
USPC ........................................................ 455/447
See application file for complete search history.

(56) References Cited

U.S. PATENT DOCUMENTS

| 9,831,899 | B1 | 11/2017 | Boghrat et al. |
| 10,040,440 | B2 | 8/2018 | Iwagami et al. |
| 10,237,877 | B1 | 3/2019 | Singh et al. |
| 2004/0235428 | A1 | 11/2004 | Nagai et al. |
| 2008/0003766 | A1 | 1/2008 | Eun et al. |
| 2008/0037665 | A1 | 2/2008 | Maeki et al. |
| 2011/0032892 | A1 | 2/2011 | Bahl et al. |
| 2012/0069804 | A1 | 3/2012 | Kim et al. |
| 2013/0051359 | A1 | 2/2013 | Skärby et al. |
| 2015/0117392 | A1* | 4/2015 | Hammarwall ....... H04J 11/0053 370/330 |
| 2016/0219495 | A1 | 7/2016 | Martin et al. |
| 2016/0219593 | A1 | 7/2016 | Ashraf et al. |
| 2017/0099675 | A1 | 4/2017 | Gineste et al. |
| 2017/0208540 | A1 | 7/2017 | Egner et al. |
| 2017/0280472 | A1 | 9/2017 | Gupta et al. |
| 2019/0110317 | A1* | 4/2019 | Zhang ............... H04W 74/0808 |

FOREIGN PATENT DOCUMENTS

CN 103065503 B 5/2015

OTHER PUBLICATIONS

U.S. Appl. No. 15/974,540, Non-Final Office Action dated May 14, 2019, 27 pages.

* cited by examiner

Primary Examiner — Amancio Gonzalez
(74) Attorney, Agent, or Firm — Han Santos, PLLC (57) ABSTRACT Techniques for identifying wireless transmission opportunities that are made available by beamforming is provided. In addition to identifying frequency bands and time divisions that are available for transmitting radio signals, beamforming capabilities of communications systems are used to identify a spatial direction that is available for transmitting radio signals in a particular frequency band. A spectrum management tool identifies the available spatial directions, frequency bands, and time divisions for transmission in a dynamic spectrum sharing environment, and a radio transmitting device is configured by the tool to transmit in the identified available spatial directions, frequency bands, and time divisions.

17 Claims, 6 Drawing Sheets

DYNAMIC SPECTRUM SHARING

BACKGROUND

The availability of radio spectrums is vital to wireless network carriers that use wireless technologies, such as 3G, 4G, and even 5G, to provide telecommunication services. The use of the radio spectrums within a nation state is generally regulated by a corresponding government of the nation state. The government of the nation state may license various bands of the radio spectrum to one or more licensees such that each licensee has exclusive use of a particular band of the radio spectrum. In order to better utilize the available radio frequency spectrums in the United States, the U.S. federal government has advocated the sharing of unused federal radio spectrums at various locations and during different times.

Newest wireless technologies such as 5G employ radio transmission techniques such as beamforming to achieve spatial selectivity. Beamforming uses multiple antenna elements in an array to focus antenna energy in a narrow beam and control the direction of the wave front of the transmitted radio signal by appropriately weighting the magnitude and phase of individual antenna signals. Beamforming makes it possible for a radio transmitter to steer radio signals in any specific spatial direction toward any specific target. Beamforming also makes it possible for a radio receiver receiving the beamforming-steered radio signal to determine the direction of the wave front of the arriving radio signal.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to systems and techniques for identifying wireless transmission opportunities that are made available by beamforming. Specifically, in addition to identifying frequency bands and time divisions that are available for transmitting radio signals, beamforming capabilities of communications systems are used to identify a spatial direction that is available for transmitting radio signals in a particular frequency band. A radio signal transmitted at the identified spatial direction would not be significantly interfered with by other radio signals of the same frequency band in other spatial directions. In some embodiments, a spectrum management tool identifies the available spatial directions, frequency bands, and/or time divisions for transmission in a dynamic spectrum sharing environment, and a radio transmitting device is configured by the tool to transmit in the identified available spatial directions, frequency bands, and/or time divisions.

Figure 1:
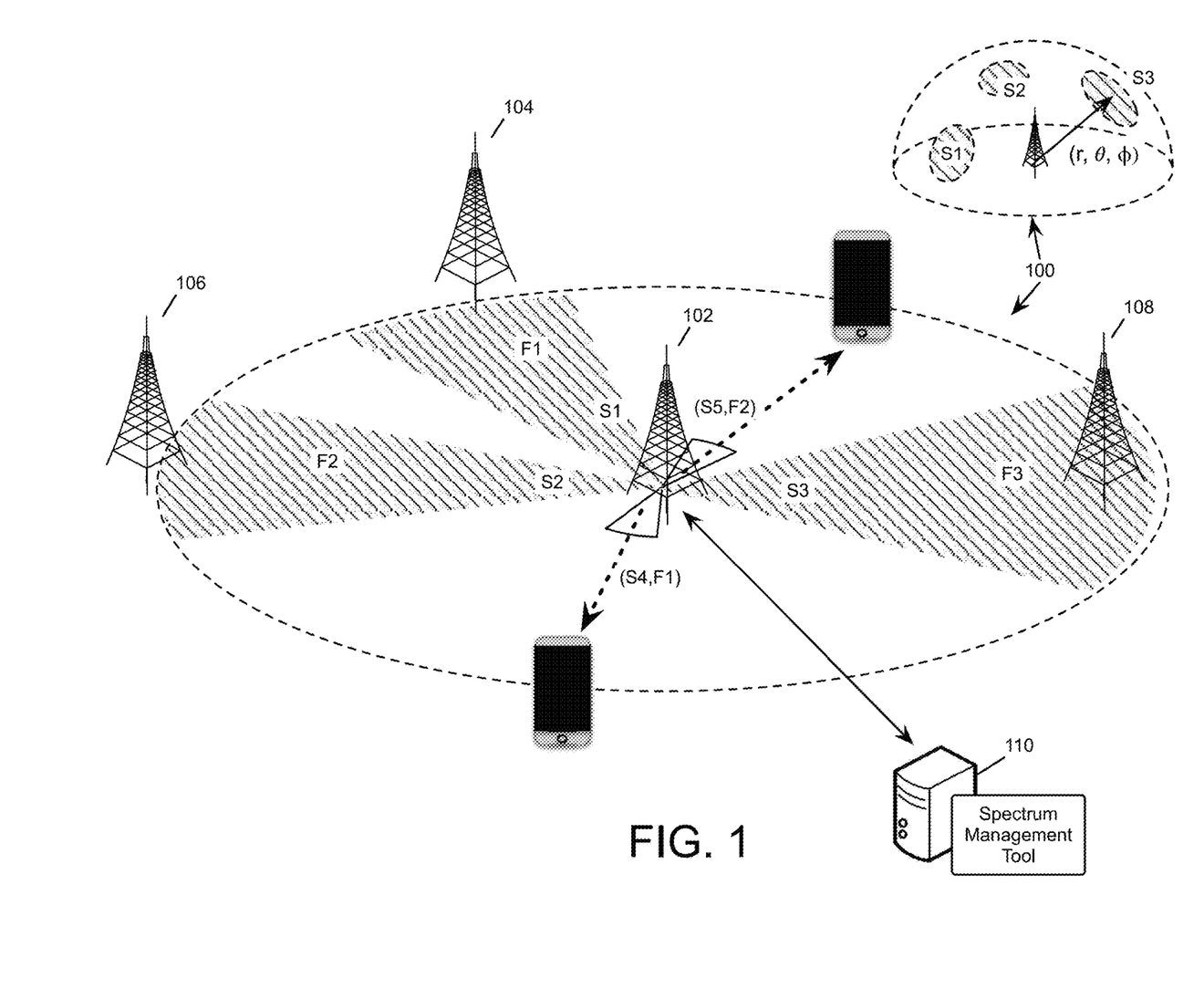
FIG. 1 conceptually illustrates a dynamic spectrum sharing environment in which a base station is configured by a spectrum management tool to transmit and receive radio signals by beamforming.

FIG. 1 conceptually illustrates a dynamic spectrum sharing environment 100 in which a base station 102 is configured by a spectrum management tool to transmit and receive radio signals by beamforming. Specifically, the tool selects a spatial direction and a frequency band for transmission at a current time and configures the base station 102 to transmit a signal at the selected spatial direction by using the selected frequency band at the current time.

The dynamic spectrum sharing environment for a base station is an environment in which the base station shares the use of the radio spectrum with one or more other signal sources based on dynamic spectrum usage information. In the dynamic spectrum sharing environment 100, the base station 102 shares the use of the radio spectrum with radio signal sources 104, 106, and 108.

The base station 102 is a system equipped with radio transmitting and receiving devices supporting communications to and from mobile devices of a wireless carrier network. The radio signal transmission devices of the base station 102 may include multiple antenna elements in an array that can be configured to aim or target a spatial direction by focusing antenna energy of the multiple antenna elements in a narrow beam at the spatial direction. The direction of the wave front of the transmitted signal is controlled by appropriately weighting the magnitude and phase of individual antenna signals.

The other radio signal sources 104, 106, and 108 may be other wireless cellular network base stations, Wi-Fi hotspots, radio stations, or other sources of electromagnetic waves. The output of these other radio signal sources may interfere with radio signals transmitted and received by the base station 102. (The other radio signal sources are therefore also referred to as interference sources). The radio interference of various frequencies produced by the interference sources are detectable at the base station 102 at different spatial directions. As illustrated, the base station 102 detects interference from the radio signal source 104 of frequency band F1 at spatial direction S1. The base station 102 detects interference from the radio signal source 106 of frequency band F2 at spatial direction S2. The base station 102 detects interference from the radio signal source 108 of frequency band F3 at spatial direction S3.

In some embodiments, each spatial direction (e.g., S1, S2, and S3) includes a range of multi-dimension spatial coordinates. For example, in some embodiments, each spatial direction can be represented by a three-dimensional spatial range in spherical coordinates $(r, \theta, \phi)$ or in cartesian coordinates $(x, y, z)$. In some embodiments, each spatial direction is represented by a two-dimensional spatial range in spherical coordinates $(\theta, \phi)$ since the distance r between base station 102 and an interference source may not be needed when identifying a spatial direction that is available for transmitting and receiving signals.

The operations of the base station 102 is controlled by a computing device 110, which is executing the spectrum management tool. The spectrum management tool receives dynamic interference data and static usage data and configures the radio signal transmitting and receiving devices (jointly referred to as transceivers) of the base station 102 according to the received data.

The dynamic interference data is based on measurements of the interference at the current time. The dynamic interference data may include the measurements of radio signals or electromagnetic waves detected by the antennas of the base station. The measurements of the detected signals may include the frequencies and the strengths of the detected signals as well as the spatial directions from which the signals are detected. The dynamic interference data may also be based on an accumulation of measurements of the interference over a period of time for different frequency bands at different spatial directions.

The static usage data is statically available data about the usage of the radio spectrum. The static usage data may include static usage or allocation data that the spectrum management tool extracts from different databases maintained by various public and private agencies at international, national, and local levels. Examples of these agencies include the Federal Communications Commission (FCC), the National Telecommunications and Information Administration (NTIA), the International Telecommunications Union (ITU), and the Third Generation Partnership Project (3GPP). In some embodiments, the spectrum management tool uses the static interference data to identify frequency bands to avoid when using the dynamic interference data to select a spatial direction and a frequency band for transmission at the current time.

The interference data used by the spectrum management tool to control the base station 102 includes reports of interference due to the other signal sources 104, 106, and 108 (i.e., interference at frequency band F1 from spatial direction S1, interference at frequency F2 from spatial direction S2, and interference at frequency band F3 from spatial direction S3.) The spectrum management tool in turn identifies spatial directions and frequency bands in which the signals from signal sources 104, 106, and 108 would not interfere with the signals transmitted or received by the base station 102 at the current time. The spectrum management tool correspondingly selects a spatial direction and a frequency band for transmission and configures the radio transceivers of the base station to transmit signals of the selected frequency at the selected spatial direction. Specifically, the spectrum management tool configures the antenna array to focus the energy of the antenna array at the selected spatial direction by beamforming.

In the example of FIG. 1, the base station 102 is configured to transmit a signal in frequency band F1 at spatial direction S4. This enables the use of the frequency band F1 by the base station 102, even though the signal source 104 is also transmitting in frequency band F1 (albeit from a different spatial direction S1). The base station is also configured to transmit a signal in frequency band F2 at spatial direction S5 by beamforming. This enables the use of the frequency band F2 by the base station 102, even though the signal source 106 is also transmitting in frequency band F2 (albeit from a different spatial direction S2).

Figure 2A:
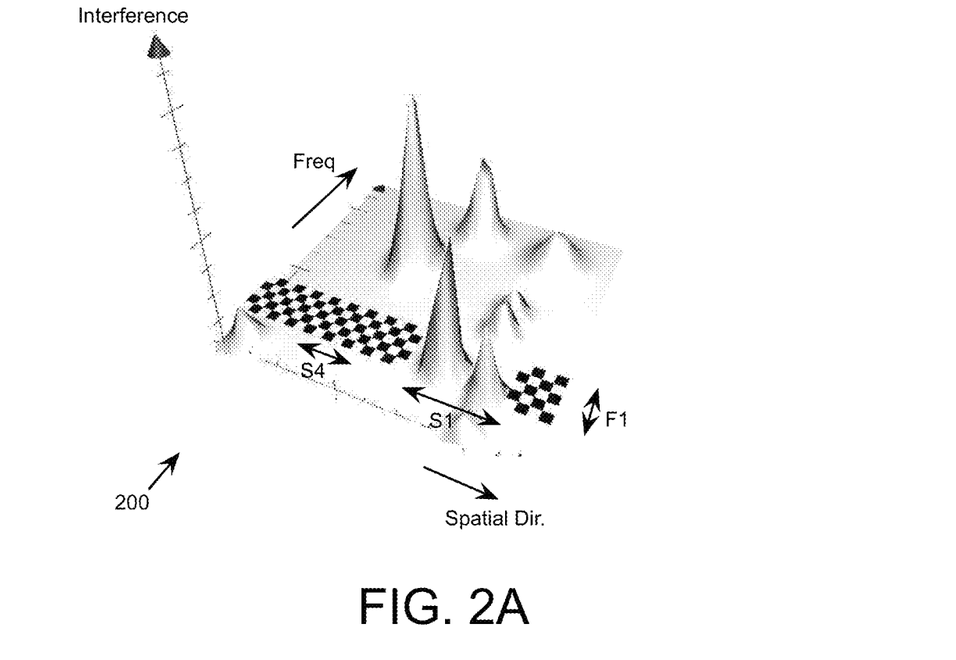
FIG. 2A and FIG. 2B conceptually illustrate the selection of spatial directions for transmitting signals in the dynamic sharing environment.
Figure 2B:
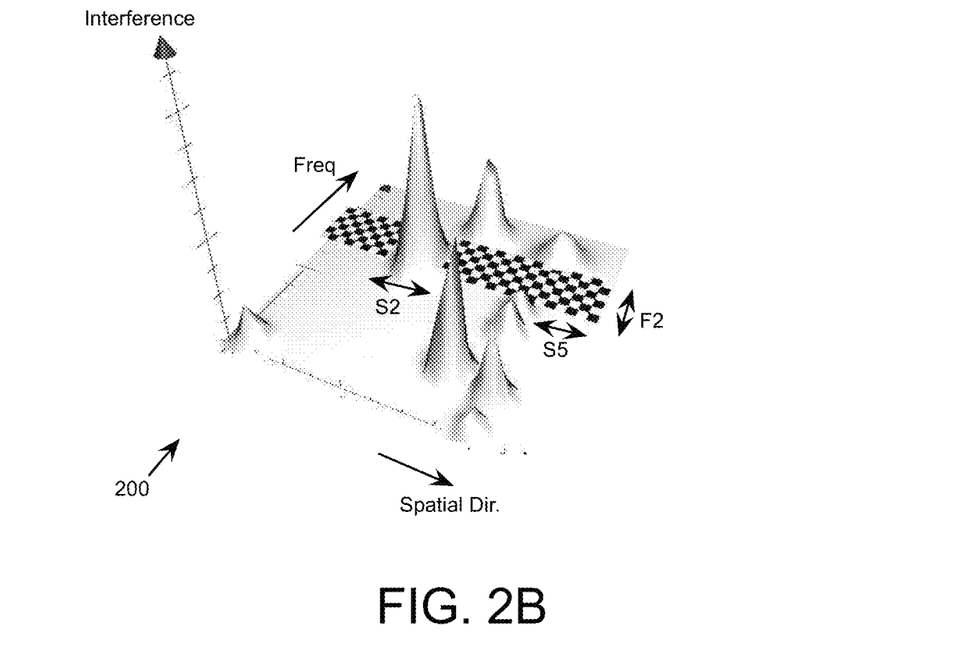

FIG. 2A and FIG. 2B conceptually illustrate the selection of spatial directions for transmitting signals in the dynamic sharing environment. The figures show the strengths of the interference detected by the base station 102 at different frequencies across different spatial directions in a three-dimensional (3D) graph 200. The z-axis of the 3D graph corresponds to strength of interference, the y-axis corresponds to frequency, and x-axis corresponds to spatial direction. Peaks in the 3D graph 200 corresponds to significant interference.

The spectrum management tool selects frequency bands and spatial direction by finding a spatial direction at which a frequency band is available for transmission, even if the frequency band is not available for transmission in all spatial directions because of interference. In some embodiments, the spectrum management tool selects a spatial direction at which the interference is below a certain threshold for a given frequency band. In some embodiments, the spectrum management tool selects a spatial direction at which the interference is the least for a given frequency band (i.e., a spatial direction at which the amount of interference for the given frequency is less than at all other spatial directions). In some embodiments, the spectrum management tool uses the static usage data to identify frequency bands that are already allocated and cannot be shared for transmission by the base station.

FIG. 2A illustrates the selection of a spatial direction for transmitting signals in frequency band F1. Spatial directions in which the interference in the frequency band F1 is below a certain threshold is illustrated as checkered. In the example, the frequency band F1 has significant interference at spatial direction S1 but has below-threshold interference elsewhere. Spatial direction S4 in particular has the least amount of interference for frequency band F1. The spectrum management tool therefore selects spatial direction S4 for transmitting signals in the frequency band F1 by beamforming.

FIG. 2B illustrates the selection of a spatial direction for transmitting signals in frequency band F2. Spatial directions in which the interference in the frequency band F2 is below a certain threshold is illustrated in a checkered pattern. In the example, the frequency band F2 has significant interference at spatial direction S2 but has below-threshold interference elsewhere. Spatial direction S5 in particular has the least amount of interference for frequency band F2. The spectrum management tool therefore selects spatial direction S5 for transmitting signals in the frequency band F2 by beamforming.

In some embodiments, the spectrum management tool provides a graphical user interface (GUI) so that the tool may present the detected radio interference graphically in the GUI. The GUI may present radio interference strengths at different spatial directions for a particular frequency band for a particular time. The GUI may also present radio interference strengths at different spatial locations for different frequency bands for a particular time. The GUI may present radio interference strengths at different spatial locations for different frequency bands for different time instances.

Figure 3:
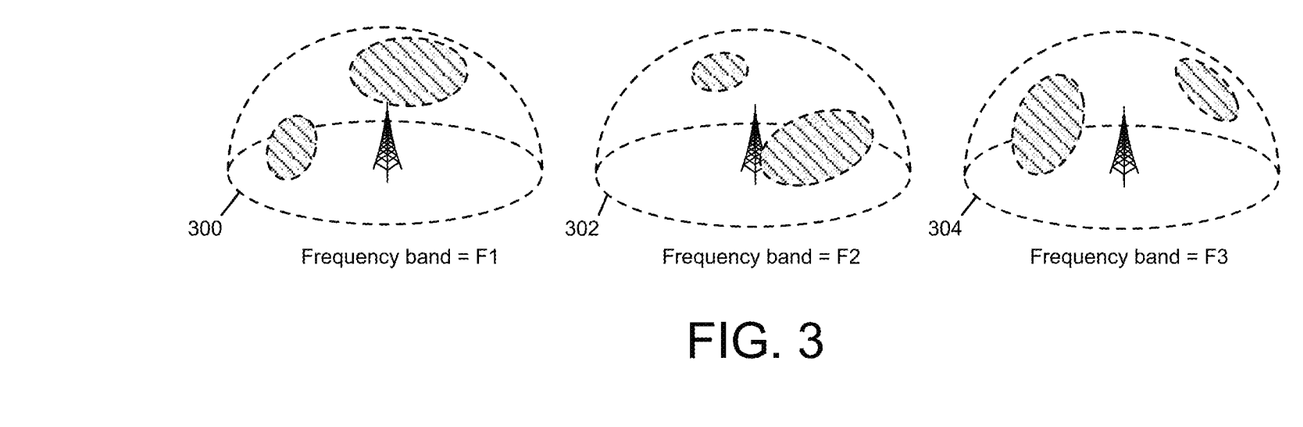
FIG. 3 illustrates example presentations of radio interference strengths at different spatial directions for a particular frequency band by a GUI.

FIG. 3 illustrates example presentations of radio interference strengths at different spatial directions for a particular frequency band by a GUI. The GUI displays a 3-dimensional (3D) dome 300 that represents possible spatial positions from the perspective of the base station 102. The spatial positions on the surface of the 3D dome correspond to different spherical coordinate positions (r, θ, φ) with fixed r. The spectrum management tool may show the interference as patterns on the surface of the dome 300 for a particular frequency band. (The spatial directions with interference are illustrated as shaded regions on the dome 300.) The GUI may show the interference for different frequency bands on the same dome 300 (e.g., a first color and/or pattern for showing the interference in frequency band F1, a second color and/or pattern for showing the interference in frequency band F2, etc.), or on multiple different domes (e.g., the dome 300 for showing the interference in frequency band F1, another dome 302 for showing the interference in frequency band F2, another dome 304 for showing the interference in frequency band F3, etc.). The GUI may display the interference of a particular time (e.g., the current time) on the dome 300. The GUI may display the interference at multiple different times on different domes.

Figure 4:
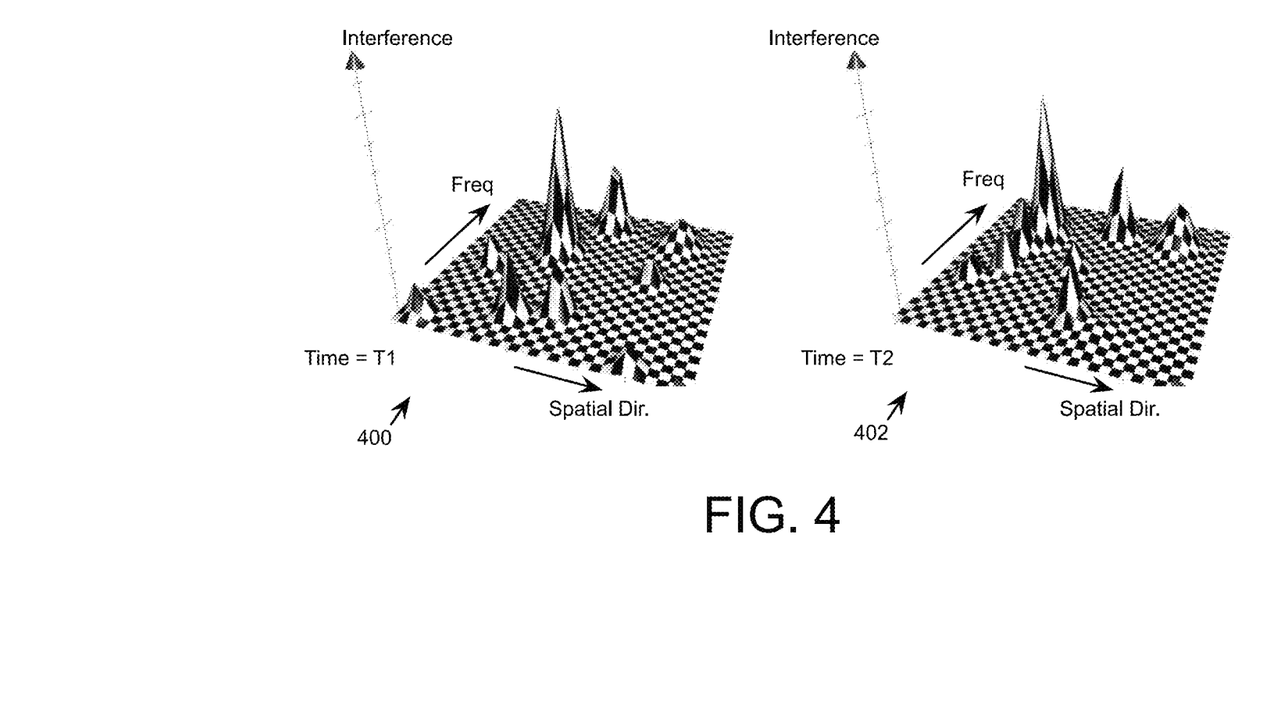
FIG. 4 illustrates example presentations of radio interference strengths at different spatial locations and different frequencies in a GUI.

FIG. 4 illustrates example presentations of radio interference strengths at different spatial locations and different frequencies in a GUI. The GUI shows the strengths of the interference detected by the base station 102 at different frequencies and different spatial directions in a three-dimensional (3D) graph 400. The z-axis of the 3D graph corresponds to strength of interference, the y-axis corresponds to frequency, and x-axis corresponds to spatial direction. The GUI may display the interference of a particular time (e.g., the current time) on the 3D graph 400. The GUI may display the interference at multiple different times on different 3D graphs (e.g., the 3D graph 400 for time=T1 and another 3D graph 402 for time=T2).

In some embodiments, the GUI of the spectrum management tool may allow a user to manually select a spatial direction or a frequency band by e.g., selecting a graphical item in the GUI that corresponds to a frequency band or a spatial direction.

Example Computing Device

Figure 5:
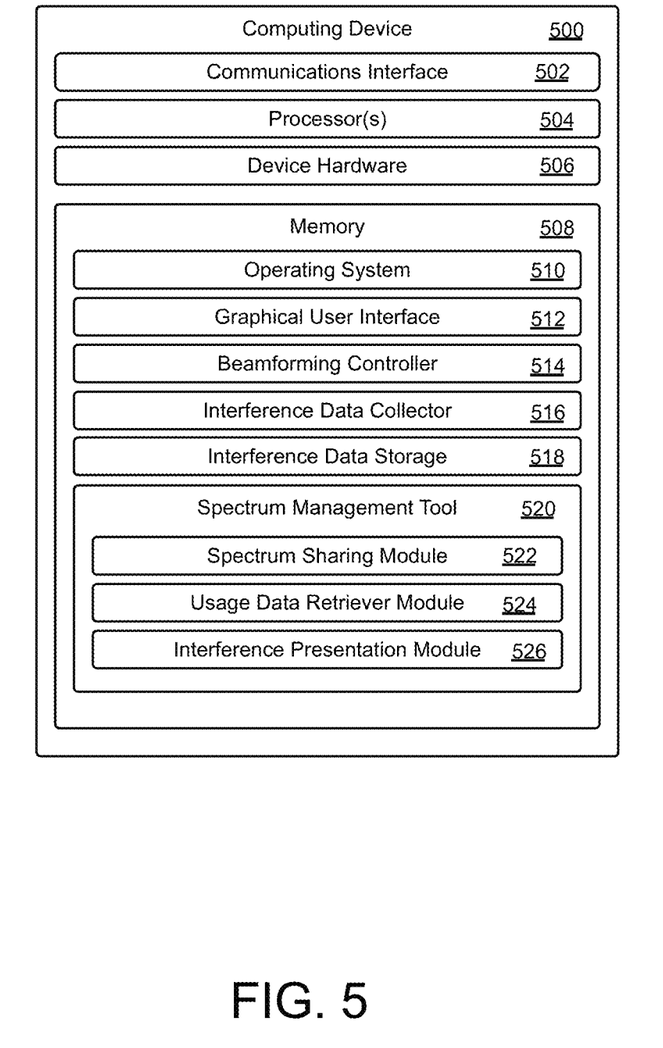
FIG. 5 is a block diagram showing various components of a computing device implementing the spectrum management tool, consistent with an embodiment of the disclosure.

FIG. 5 is a block diagram showing various components of a computing device 500 implementing the spectrum management tool, consistent with an embodiment of the disclosure. The computing device 500 is capable of interfacing with the base station 102 and controlling its operating frequency band and antenna array. The computing device 500 may be a general-purpose computer, such as a desktop computer, tablet computer, laptop computer, server, or other electronic devices that are capable of receiving inputs, processing the inputs, and generating output data. In some embodiments, the computing devices 500 may be virtual computing devices in the form of virtual machines or software containers that are hosted in a cloud.

The computing device 500 may be equipped with a communications interface 502, one or more processors 504, device hardware 506, and memory 508. The communications interface 502 may include wireless and/or wired communication components that enable the computing device 500 to transmit data to and receive data from other devices, whether through a dedicated wired connection or via a communications network. For example, the communications interface 502 enables the computing device 500 to communicate with the base station 102 so that the spectrum management tool may configure the antenna array of the base station for beamforming. The device hardware 506 may include additional hardware that performs user interface, data display, data communication, data storage, and/or other server functions.

The memory 508 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 504 and the memory 508 of the computing devices 500 may implement an operating system 510, a graphical user interface (GUI) 512, a beamforming controller 514, an interference data collector 516, an interference data storage 518, and the spectrum management tool 520.

The operating system 510 may include components that enable the computing devices 500 to receive and transmit data via various interfaces (e.g., user controls, communications interface, and/or memory input/output devices), as well as process data using the processors 504 to generate output. The operating system 510 may include a presentation component that presents the output (e.g., display the data on an electronic display, store the data in memory, transmit the data to another electronic device, etc.). Additionally, the operating system 510 may include other components that perform various additional functions generally associated with an operating system.

The graphical user interface (GUI) module 512 is a program that allows the computing device 500 to receiving inputs graphically and to present outputs graphically. The GUI module causes the computing device to display GUI for presenting outputs of various programs running on the computing device. The GUI module 512 also causes the computing device to display graphical items that can be used to receive inputs by selection (via cursor, touch screen, user gesture, etc.) or by textual input. In some embodiments, the GUI module 512 is part of the operating system 510.

The beamforming controller 514 is responsible for controlling the antenna array of the base station 102 for beamforming through the communications interface 502. The interference data collector 516 collects interference data based on radio measurements from a base station. The collected interference data is stored in the interference data storage 518. In some embodiments, the beamforming controller 514, the interference data collector 516, and the interference data storage 518 are components of the spectrum management tool 520.

The spectrum management tool 520 is a program executing on the computing device 500. The spectrum management tool 520 uses the beamforming controller 514 to configure a base station operating frequency band and antenna array based on the interference data stored in the interference data storage 518.

The spectrum management tool 520 may use the GUI module 512 to present interference in different spatial directions for different frequency bands as 3D graphics, such as those illustrated in FIG. 3 and FIG. 4. The tool 520 may also use the GUI module 512 to display allocation charts, maps, interference data, usage and allocation data, etc. Additionally, the tool 520 may also use the GUI module 512 to receive the selection or specification of a spatial location, a frequency band, or a geographic location from the user. The spectrum management tool 520 includes a spectrum sharing module 522, a usage data retriever module 524, and an interference presentation module 526. The spectrum sharing module 522 selects frequency bands and spatial directions for transmission based on the interference data, the current time, and the current location. The usage data retriever module 524 retrieves static usage data of the frequency bands from one or more databases. The interference presentation module 526 formats the interference data for presentation in the GUI.

Figure 6:
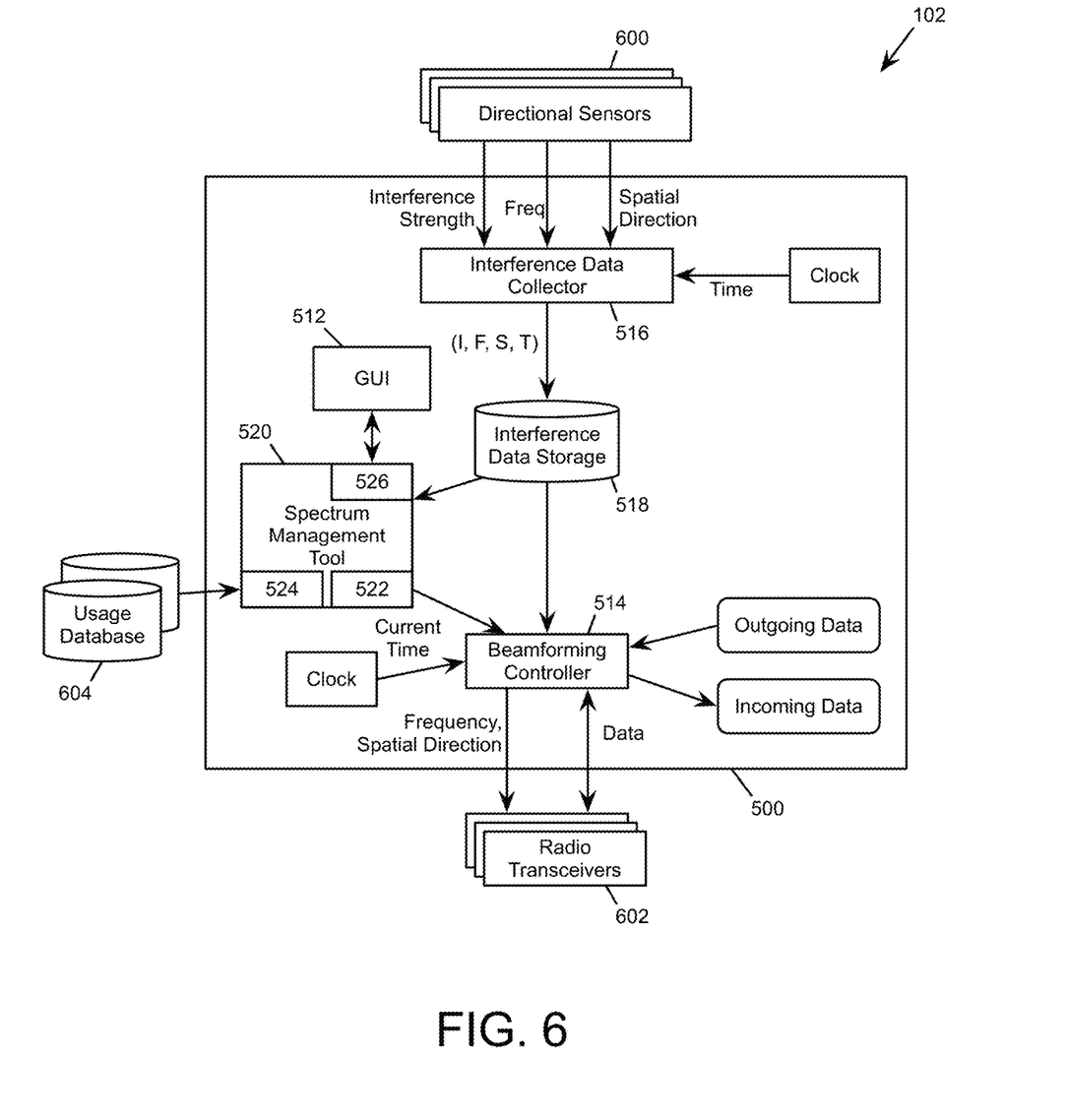
FIG. 6 illustrates a block diagram of a base station that is controlled by the computing device operating the spectrum management tool, consistent with an exemplary embodiment.

FIG. 6 illustrates a block diagram of the base station 102 that is controlled by the computing device 500 operating the spectrum management tool 520, consistent with an exemplary embodiment. The base station 102 is a communications system that includes directional sensor 600, radio transceivers 602, and the computing device 500.

As illustrated, the directional sensors 600 provide measurements of detected radio signals to the computing device (through the communications interface 502). These measurements may include the signal strengths, the frequencies, and the spatial directions of the detected radio signals. The interference data collector 516 formats the collected measurements into interference data. The formatted interference data is stored in the interference data storage 518. The interference data collector 516 may optionally associate the collected interference data with time stamps.

The spectrum management tool 520 retrieves the interference data from the interference data storage 518. The interference presentation module 526 of the spectrum management tool 520 presents the interference data at different spatial directions, frequencies, and times as 3D graphics for display by the GUI 512.

The spectrum sharing module 522 of the spectrum management tool 520 selects frequency bands and spatial directions for transmission based on the interference data stored in the interference data storage 518. The spectrum sharing module 522 selects a spatial direction and a frequency band for transmission so that the signals in the selected band targeting the selected spatial direction has the least level of interference, or an acceptable level of interference that is below a predetermined interference level threshold. The selected spatial directions and frequencies are provided to the beamforming controller 514.

In some embodiments, the usage data retriever module 524 of the spectrum management tool retrieves static usage and allocation data for various frequency bands from multiple databases 604. The spectrum sharing module 522 uses the retrieved usage and allocation data to supplement the detected interference data for the current location when selecting a frequency band and spatial direction for transmission. In some embodiments, the spectrum management tool displays the retrieved static usage and allocation data by using the GUI module 512.

The beamforming controller 514 send outgoing data to the radio transceivers 602 to be transmitted in the selected frequency band at the selected spatial direction. The beamforming controller 514 may also receive incoming data from the radio transceivers 602. The beamforming controller 514 performs beamforming by instructing the array of antenna elements to focus the energy of the antenna array at the selected spatial direction.

Figure 7:
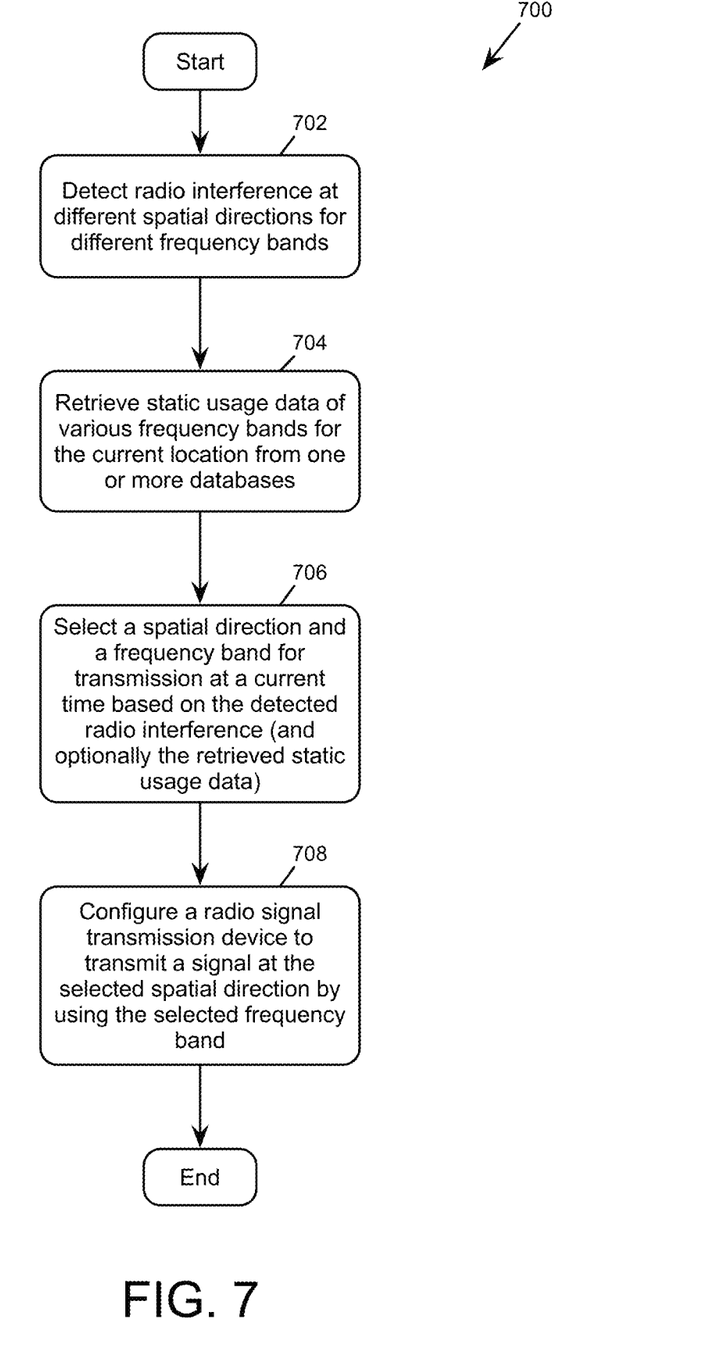
FIG. 7 conceptually illustrates a process for identifying spectrum opportunities and for directing a radio signal transmission device to use the identified spectrum opportunities.

FIG. 7 conceptually illustrates a process 700 for identifying spectrum opportunities and for directing a radio signal transmission device to use the identified spectrum opportunities. A computing device (e.g., the computing device 500) controlling a base station of a cellular network (e.g., the base station 102) may perform the process 700 when using the spectrum management tool to search for an available frequency band for transmission.

The process 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 702, the computing device detects radio interference at different spatial directions for different frequency bands. In some embodiments, the computing device detects the radio interference by accessing the directional sensors of the base station and retrieves signal measurements from the directional sensors as detected interference for a current time. In some embodiments, the computing device detects radio interference by detecting radio signals at different spatial directions for different frequency bands over a period of time. The process then proceeds to 704.

At block 704, the computing device retrieves static usage data of the radio spectrum for the current location (the location of the base station) from one or more databases. In some embodiments, the spectrum management tool uses the retrieved usage and allocation data to supplement the detected interference data for the current location. In some embodiments, the spectrum management tool relies entirely on dynamically detected interference data so the operations of the block 704 may be skipped. The process then proceeds to 706.

At block 706, the computing device selects a spatial direction and a frequency band for transmission at a current time based on the detected radio interference. In some embodiments, the computing device selects a spatial direction and a frequency band for transmission so that the signals in the selected band targeting the selected spatial direction would have the least level of interference (or an acceptable level of interference). In some embodiments, the computing device uses the static usage data to identify frequency bands that are already allocated and cannot be used for transmission. The selection of spatial direction and frequency band is described above by reference to FIG. 2A and FIG. 2B. The process then proceeds to 708.

At block 708, the computing device configures a radio signal transmission device of the base station to transmit a signal at the selected spatial direction by using the selected frequency band. The radio signal transmission device may include multiple antenna elements in an array that are configured to focus antenna energy in a narrow beam, i.e., beamforming. The direction of the wave front of the transmitted signal is controlled by appropriately weighting the magnitudes and phases of individual antenna signals. The process 700 then ends.

The technique of identifying and using a least interfered spatial direction for transmission by beamforming as described above can be applied to licensed band, unlicensed bands, and shared bands. Previously, spectrum sharing in unlicensed bands and shared bands has relied on different variations of Listen-Before-Talk (LBT) techniques, which allows different users to share a same frequency channel at different times divisions. The technique of identifying and using a least interfered spatial direction for transmission by beamforming would result in much more efficient use of unlicensed and shared bands.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computing device comprising:
   one or more processors; and
   a computer-readable medium storing a plurality of computer-executable components that are executable by the one or more processors to perform a plurality of actions, the plurality of actions comprising:
   detecting radio interference at different spatial directions for different frequency bands;
   presenting the detected radio interference graphically in a graphical user interface (GUI);
   selecting a spatial direction and a frequency band for transmission at a current time based on the detected radio interference; and
   configuring a radio signal transmission device to transmit a signal at the selected spatial direction by using the selected frequency band.

2. The computing device of claim 1, wherein detecting radio interference comprises:
   detecting radio signals at different spatial directions for different frequency bands over a period of time.

3. The computing device of claim 1, wherein configuring the radio signal transmission device comprises configuring a plurality of antenna elements to aim the plurality of antenna elements at the selected spatial direction and to transmit a signal in the selected frequency band.

4. The computing device of claim 1, wherein selecting the spatial direction and the frequency band for transmission at the current time based on the detected radio interference comprises identifying a spatial direction having a least amount of radio interference for a given frequency band.

5. The computing device of claim 1, wherein the plurality of actions further comprising retrieving static usage data of different frequency bands at a current location from a plurality of different databases, wherein selecting the spatial direction and the frequency band for transmission at the current time is further based on the static usage data of the different frequency bands.

6. The computing device of claim 1, wherein presenting the detected radio interference comprises presenting strengths of the detected radio interference at different spatial directions for a particular frequency band for a particular time.

7. The computing device of claim 1, wherein selecting the spatial direction and the frequency band is further based on a selection of a graphical item in the GUI.

8. One or more non-transitory computer-readable media of a computing device storing computer-executable instructions that upon execution cause one or more processors to perform acts comprising:
   detecting radio interference at different spatial directions for different frequency bands;
   retrieving static usage data of different frequency bands at a current location from a plurality of different databases;
   selecting a spatial direction and a frequency band for transmission at a current time based on the detected radio interference and the static usage data of the different frequency bands; and
   configuring a radio signal transmission device to transmit a signal at the selected spatial direction by using the selected frequency band.

9. The one or more non-transitory computer-readable media of claim 8, wherein detecting radio interference comprises:
   detecting radio signals at different spatial directions for different frequency bands over a period of time.

10. The one or more non-transitory computer-readable media of claim 8, wherein configuring the radio signal transmission device comprises configuring a plurality of antenna elements to aim the plurality of antenna elements at the selected spatial direction and to transmit a signal in the selected frequency band.

11. The one or more non-transitory computer-readable media of claim 8, wherein selecting the spatial direction and the frequency band for transmission at the current time based on the detected radio interference comprises identifying a spatial direction having a least amount of radio interference for a given frequency band.

12. The one or more non-transitory computer-readable media of claim 8, wherein the computer-executable instructions upon execution further cause the one or more processors to perform acts comprising:
   providing a graphical user interface (GUI); and
   presenting the detected radio interference graphically in the GUI.

13. The one or more non-transitory computer-readable media of claim 12, wherein presenting the radio interference comprises presenting strengths of the detected radio interference at different spatial directions for different frequency bands for a particular time.

14. A computer-implemented method, comprising:
   detecting radio interference at different spatial directions for different frequency bands;
   retrieving static usage data of different frequency bands at a current location from a plurality of different databases;
   selecting a spatial direction and a frequency band for transmission at a current time based on the detected radio interference and the static usage data of the different frequency bands; and
   configuring a radio signal transmission device to transmit a signal at the selected spatial direction by using the selected frequency band.

15. The computer-implemented method of claim 14, wherein configuring the radio signal transmission device comprises configuring a plurality of antenna elements to aim the plurality of antenna elements at the selected spatial direction and to transmit a signal in the selected frequency band.

16. The computer-implemented method of claim 14, wherein selecting the spatial direction and the frequency band for transmission at the current time based on the detected radio interference comprises identifying a spatial direction having a least amount of radio interference for a given frequency band.

17. The computer-implemented method of claim 14, further comprising:
   providing a graphical user interface (GUI); and
   presenting the detected radio interference graphically in the GUI, wherein presenting the radio interference comprises presenting strengths of the detected radio interference at different spatial directions for different frequency bands for different time instances.

* * * * *